July 31, 1934.    R. N. WALLACH    1,968,625

MARKED MATERIAL AND METHOD FOR ITS MANUFACTURE

Filed March 24, 1932

INVENTOR
ROGER N. WALLACH
BY
Watson, Bristol, Johnson & Leavenworth
ATTORNEYS

Patented July 31, 1934

1,968,625

UNITED STATES PATENT OFFICE 1,968,625

MARKED MATERIAL AND METHOD FOR ITS MANUFACTURE

Roger N. Wallach, Briarcliff Manor, N. Y., assignor to Sylvania Industrial Corporation, Fredericksburg, Va., a corporation of Virginia Application March 24, 1932, Serial No. 601,063

17 Claims. (Cl. 41—21)

This invention relates to a method for the manufacture of a marked sheet or film of material and the article produced thereby. More particularly, it relates to the marking of a sheet of transparent, homogeneous material.

Prior methods of marking homogeneous material, such as transparent regenerated cellulose, have entailed the application of opaque inks and similar opaque compositions to the surface thereof. Such compositions have been applied for advertising purposes and, accordingly, have been particularly prominent on the material. This desideratum does not permit of a composition being employed as a watermark or the like which becomes visible only upon special examination and does not interfere with advertising matter or the like which may be placed upon the material.

An object of the invention is to provide a method whereby an indentifying mark can be easily and simply applied to either a colored or colorless sheet or film of transparent material, the mark not interfering with either the color of the sheet or the transparency thereof and not being visible except upon special scrutiny.

Another object of this invention is to provide a flexible sheet or film of transparent material having an identifying characteristic simulating a watermark.

It is a further object of this invention to provide a method of applying an identifying characteristic to flexible sheets or films of material, particularly of a transparent type.

It is a still further object of this invention to provide a method of applying an identifying characteristic to a sheet or film of colored and transparent, homogeneous material whereby the coloring or transparency of the material will not be impaired.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

Generally speaking, the present method comprises the application to a flexible sheet of transparent material of a composition which is substantially transparent but which has a different refractive index for visible light than the material to which it is applied. Although the composition is substantially transparent, nevertheless a design formed therefrom is discernible both by transmitted and by reflected light, and any desired characters, for instance in the nature of advertising media, may be printed or stamped with little, if any, change in the appearance of the original sheet. When viewed by transmitted light, the mark or character is readily visible so that the basic sheet may be easily identified.

The present process is particularly applicable to flexible sheets or films of homogeneous materials, e. g., regenerated cellulose, cellulose derivatives, such as ethyl cellulose, methyl cellulose, nitrocellulose and cellulose acetate; gelatin, casein and synthetic or natural resins. Such materials are usually transparent, but it is to be understood that materials which are somewhat translucent, or otherwise expressed as having at least one homogeneous continuous phase, such as glassine, may be processed as herein described. The sheets or films may be colorless, slightly tinted, dyed, or otherwise colored as may be desired for the purpose for which they are to be employed.

For a more complete understanding of the nature and objects of the invention, reference should be had to the following detailed description taken in connection with the attached drawing, in which.

Figure 1:
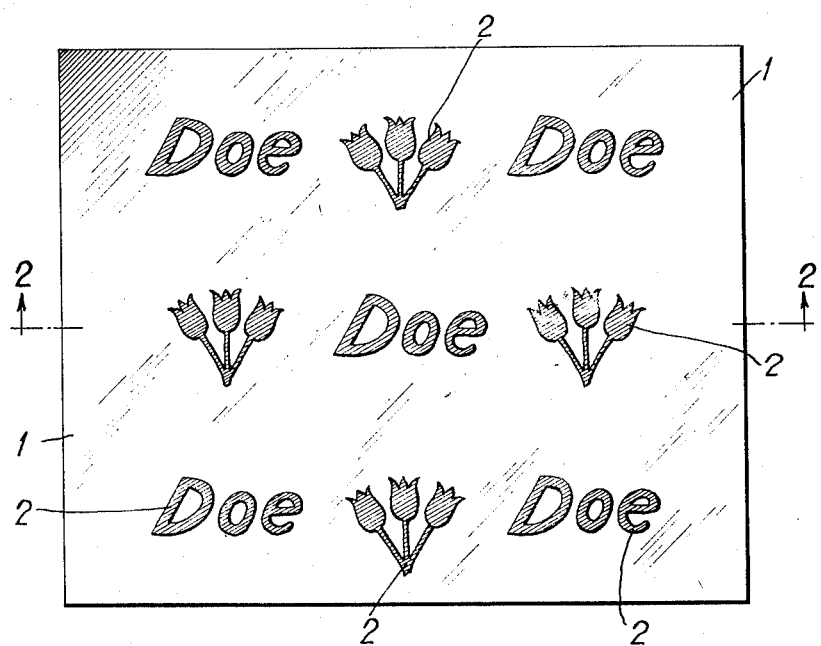
Figure 1 is a plan view of one embodiment of the invention showing a sheet of transparent material having a design thereon of a transparent composition. For the purposes of illustration the design in the drawing has been shaded to indicate that the composition has a refractive index different from that of the transparent material.
Figure 2:
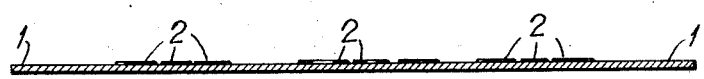
Figure 2 is a sectional view slightly enlarged in the vertical plane of the sheet of Figure 1 taken along the line 2—2 thereof.

More specifically, a solution is prepared containing a composition, which is preferably transparent, in a suitable solvent. The solvent should be one which is highly volatile and easily removed by exposure to atmospheric conditions, or to artificial drying conditions. The solution thus prepared is applied to a sheet of transparent material 1 in predetermined areas and the solvent evaporated to leave thereon a transparent design 2. While the composition has been described as being preferably transparent, it may be colored, in which case it may be colored to substantially the same shade as the sheet or film to which it is to be applied. The desired characteristics of the composition employed include that it be substantially transparent and have a different refractive index to visible light than that of the sheet or film to which it is to be applied. By way of example, a suitable solution for a colorless transparent sheet, such as a sheet of regenerated cellulose, may be formed by dissolving a nitrocellulose in a suitable solvent. The solution applied need not be confined to a single substance as a nitrocellulose, or the like in solution, but may be a multi-component lacquer. Thus, the lacquer may contain one of the well-known lacquer bases, e. g., a cellulose derivative as ethyl cellulose, a cellulose acetate, a cellulose nitrate, etc., or a lacquer resin, as a synthetic or a natural resin, for example a poly-vinyl resin, albertol, etc., together with plasticizers, gums, oils, waxes, etc., substantially the only requirement being that the composition be such that it will give rise to a solid, transparent design, or mark having a refractive index for visible light differing from that of the sheet to which it is applied. Various methods of application may be employed as printing, engraving, stenciling, or other known reproduction methods.

The solution for forming the markings may contain about 50-70 parts of a cellulose derivative, 30-50 parts of a gum or a resin, and 5-30 parts of a plasticizer. Specifically, such a solution includes 65 parts of a nitrocellulose, 10 parts ester gum, and 20 parts diethylphthalate.

The solution may be applied in any suitable manner, as by printing, engraving, stamping, etc., to the transparent material, for example, a sheet or film of regenerated cellulose, the solution being deposited in the form of a predetermined design. The solvent is then evaporated, for example, by warming the sheet or subjecting it to a drying atmosphere, and a nitrocellulose-containing composition remains on the sheet as a raised design. This design is substantially invisible to the eye except by transmitted light and in this respect it simulates watermarks commonly found on paper. The term "watermark" as used hereinafter is intended to refer to a mark having the characteristics herein described.

If a colored sheet or base is to be marked, compositions may be used which are colored substantially the same as the sheet material by a suitable coloring matter.

If the printing face be engraved with parallel lines or other design, and the composition applied by means of such printing surface, the uneven surface of the resulting design gives an effect easily discernible by reflected light. By this means a greater contrast may be achieved between the "water-mark" and the base material.

The design or mark employed may be by way of identification as a trade-mark, or a trade name, or for advertising or decorating purposes. In decorating, particularly attractive designs may be worked out and applied to the material, such designs being visible only in certain lights, thus presenting a striking appearance.

The identifying characters applied as described herein do not affect the general appearance, transparency or color of the basic material to which they are applied, nor do they affect the flexibility when it is employed as a wrapping material. The mark is substantially invisible except upon special examination and does not interfere with any advertising media or printing matter that may be placed thereon or on the basic material. However, when it is desired to identify the basic material, it need only be viewed by transmitted light, or held at an angle to incident light when the mark becomes readily visible.

Since certain changes in carrying out the above process, and certain modifications in the article which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. As an article of manufacture, a flexible transparent material having a predetermined design thereon of a transparent composition, said composition having a refractive index different from that of said transparent material.

2. As an article of manufacture, a flexible sheet of transparent material having a predetermined design thereon of a transparent composition, said composition having a refractive index different from that of said sheet material.

3. As an article of manufacture, a transparent regenerated cellulose having a predetermined design thereon of a transparent composition, said composition having a refractive index different from that of said transparent material.

4. As an article of manufacture, a sheet of transparent regenerated cellulose having a predetermined design thereon of a transparent nitrocellulose composition, said composition having a refractive index different from that of said transparent material.

5. An article of manufacture comprising in combination a flexible sheet of transparent material, and a watermark, said watermark comprising a transparent composition in a predetermined design.

6. An article of manufacture comprising in combination a flexible sheet of transparent material, and a watermark, said watermark comprising a transparent composition in a predetermined design, and said composition having a refractive index different from that of the sheet material.

7. An article of manufacture comprising in combination a sheet of transparent material, and a watermark, said watermark comprising a transparent nitrocellulose composition in a predetermined design.

8. An article of manufacture comprising in combination a sheet of transparent regenerated cellulose, and a watermark, said watermark comprising a transparent nitrocellulose composition in a predetermined design.

9. An article of manufacture comprising in combination a colored sheet of transparent regenerated cellulose, and a watermark, said watermark comprising a nitrocellulose composition of substantially the same color as said sheet in a predetermined design.

10. A process for manufacturing a marked material, which comprises applying to a flexible sheet of transparent material a transparent composition containing a suitable solvent in a predetermined design and removing said solvent.

11. A process for manufacturing a marked transparent material, which comprises applying to a sheet of transparent regenerated cellulose a solution yielding a transparent substance of a different refractive index in a predetermined design and evaporating solvent from said solution.

12. A process for manufacturing a marked material, which comprises applying a composition containing transparent nitrocellulose in a suitable solvent to transparent regenerated cellulose in a predetermined design and evaporating said solvent.

13. A process for manufacturing a marked, colored transparent sheet of material, which comprises applying a transparent composition of substantially the same color as said sheet but of a different refractive index containing a suitable solvent to said sheet in a predetermined design and evaporating said solvent.

14. As an article of manufacture, a sheet of transparent colored material having a predetermined design thereon of a transparent composition of substantially the same color as said sheet.

15. As an article of manufacture, a wrapping material comprising a sheet of transparent regenerated cellulose having a predetermined design thereon of a transparent composition, said composition having a refractive index different from that of said transparent material.

16. As an article of manufacture, a wrapping material comprising a sheet of transparent, colored, regenerated cellulose having a predetermined design thereon of a transparent composition of substantially the same color as said sheet.

17. As an article of manufacture, a wrapping material comprising in combination a colored sheet of transparent regenerated cellulose, and a watermark, said watermark comprising a transparent nitrocellulose composition of substantially the same color as said sheet in a predetermined design.

ROGER N. WALLACH.